US005303971A

United States Patent [19]

Johnsen et al.

[11] Patent Number: 5,303,971

[45] Date of Patent: Apr. 19, 1994

[54] TAILGATE RELEASE HANDLE SECURITY DEVICE

[75] Inventors: Roger L. Johnsen, Houston, Tex.; Dimiter S. Zagoroff, Cambridge, Mass.

[73] Assignee: Steadfast Corporation, Chelsea, Mass.

[21] Appl. No.: 876,868

[22] Filed: Apr. 30, 1992

[51] Int. Cl.[5] .......... B62D 33/037

[52] U.S. Cl. .......... 296/50; 70/168; 70/202; 70/208; 70/211; 70/DIG. 58; 292/DIG. 2

[58] Field of Search .......... 296/50, 57.1; 70/163, 70/166, 167, 168, 169, 202, 208, 209, 210, 211, DIG. 58; 292/DIG. 2

[56] References Cited

U.S. PATENT DOCUMENTS

| | | | |
|---|---|---|---|
| 2,955,858 | 10/1960 | Trammell, Jr. | 292/1 |
| 3,624,317 | 11/1971 | Buckingham et al. | 379/445 |
| 4,358,150 | 11/1982 | Nash | 296/50 |
| 4,529,351 | 7/1985 | Olins | 414/545 |
| 4,584,856 | 4/1986 | Petersdorff et al. | 70/57 |
| 4,819,461 | 4/1989 | Pearson | 70/14 |
| 4,918,952 | 4/1990 | Lakoski et al. | 70/57 |
| 4,968,084 | 11/1990 | Asher et al. | 296/50 |
| 4,981,320 | 1/1991 | Bowman | 296/57.1 |
| 5,004,287 | 4/1991 | Doyle | 296/57.1 |

OTHER PUBLICATIONS

Installation Instructions, "Tailock", Late Model Chevrolet Trucks, Lindsey, 136 Browning Drive, Arlington, Tex. 76010, no date.

*Primary Examiner*—Andres Kashnikow
*Assistant Examiner*—Andrew C. Pike
*Attorney, Agent, or Firm*—Cesari and McKenna

[57] ABSTRACT

A tailgate release handle security device for attachment to a tailgate incorporates a cover comprising a metal plate and an integral inwardly extending skirt having a rim which bears against an outer panel of a tailgate. A pair of hooks, attached to the skirt, extend outward through a pair of apertures in the tailgate release handle recess and bear against the back of the tailgate outer panel. A cylindrical lock, mounted in the plate, has a locking dog which presses outwardly against the upper edge of the back of a tailgate release handle when the security device is attached to the tailgate.

12 Claims, 2 Drawing Sheets

TAILGATE RELEASE HANDLE SECURITY DEVICE

FIELD OF THE INVENTION

This invention relates generally to anti-theft tailgate devices and more specifically to an anti-theft tailgate release handle security device which hinders access to, and thereby actuation of, the tailgate handle for removal and theft of the tailgate.

BACKGROUND OF THE INVENTION

A conventional pickup truck typically has a cargo space with a tailgate at its rear. Upon release of a latching mechanism, the tailgate may be swung down around a hinge to a horizontal position to facilitate access to the cargo space to load or unload the truck. When unlatched, the tailgate can easily be lifted from its hinge and removed from the truck. Thus, the tailgate itself is particularly vulnerable to theft, presenting a need for tailgate security.

Although tailgates may differ depending on the model of the pickup truck, several elements are common to most tailgates. Typically, a tailgate has spaced-apart outer and inner panels. A recess within the outer panel accommodates a handle attached to a pair of arms that extend inwardly through the recess and connect to the latching mechanism. The handle is actuated by rotating the handle in an outward-upward direction.

Despite these basic commonalities, tailgates may differ in several respects. Among other things, they vary in the structure of the handle recess. In some tailgates the outer panel is apertured to form the handle recess. In contrast, in the tailgates to which this invention is directed, the outer panel is indented to form a recess having a back wall and peripheral side walls extending inwardly to the back wall. A pair of apertures, horizontally spaced from each other at opposite ends of the back wall, extend the vertical length of the back wall to accommodate the handle arms.

Tailgates also vary in the location of an unactuated handle relative to the exterior surface of the tailgate outer panel surrounding the recess. The handle may be flush with the exterior surface, it may be inwardly spaced from that surface, or it may extend outward beyond the surface.

Prior anti-theft devices for tailgates cover the handle recess of a tailgate with a metal plate to prevent access to the tailgate handle. However, these prior devices are designed for tailgates in which the handle is either flush with the exterior surface of the outer panel or recessed within it. They are not particularly suited for tailgates in which the handle protrudes substantially outward from the outer panel of the tailgate.

Moreover, these devices hook behind the outer panel at the top or at a side of the handle recess and, therefore, are unsuitable for use on a tailgate in which the outer panel is indented, rather than apertured, since the inner surface of the outer panel is inaccessible.

SUMMARY OF THE INVENTION

It is a principal object of this invention to provide a tailgate release handle security device which hinders access to and thereby actuation of a tailgate release handle which in its unactuated position extends outward beyond the exterior of the outer panel of the tailgate and which is actuated by rotating the handle in a direction having both an outward and an upward component Another object of this invention is to provide a tailgate release handle security device which hinders actuation of a tailgate release handle on a tailgate which has an outer panel that is indented to form a handle recess behind the release handle.

Another object of this invention is to provide a tailgate release handle security device which is simple to install and remove.

Briefly, a tailgate release handle security device embodying the invention incorporates a cover comprising a plate with an attached peripheral skirt. The plate covers the tailgate release handle and, preferably, a surrounding portion of the outer tailgate panel. The skirt bears against the outer panel and thus spaces the plate therefrom to provide space behind the plate to accommodate the handle. A pair of hooks extend from the skirt in such fashion that when the plate is positioned over the handle, the hooks extend into the apertures in the recess, bearing against the inner surface of the outer panel near the bottoms of the apertures. A lock having a locking dog is positioned near the top edge of the plate so that when the lock is in its closed position, the locking dog presses against the back of the tailgate release handle, applying a force opposite in direction to the direction in which the handle is rotated to open the tailgate. The hooks and the lock thus cooperate to secure the tailgate handle security device to the tailgate and handle and thereby prevent actuation of the handle.

To install the release handle security device, the operator simply inserts the hooks through the corresponding apertures so that they bear against the inner surface of the outer panel at the bottom of each aperture. Then the operator pushes the handle security device inward against the outer panel, and turns the key until the lock is in its closed position with the dog behind the handle.

To unlock the tailgate, the operator inserts the key, rotates the key until the lock is unlocked and removes the handle security device from the tailgate. Thus, the handle security device can be easily installed and removed without any modifications to the existing tailgate.

When locked onto the tailgate release handle, the handle security device completely covers the handle. Moreover, it bears securely against the tailgate outer panel, making it difficult to fit a prying tool between the cover and the tailgate. Even if a prying tool were inserted between the handle security device and the tailgate, the application of a force sufficient to pry the handle security device from the tailgate would damage the tailgate itself and thus render it unsaleable. Thus, the handle security device effectively deters tailgate theft.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENT

Figure 1:
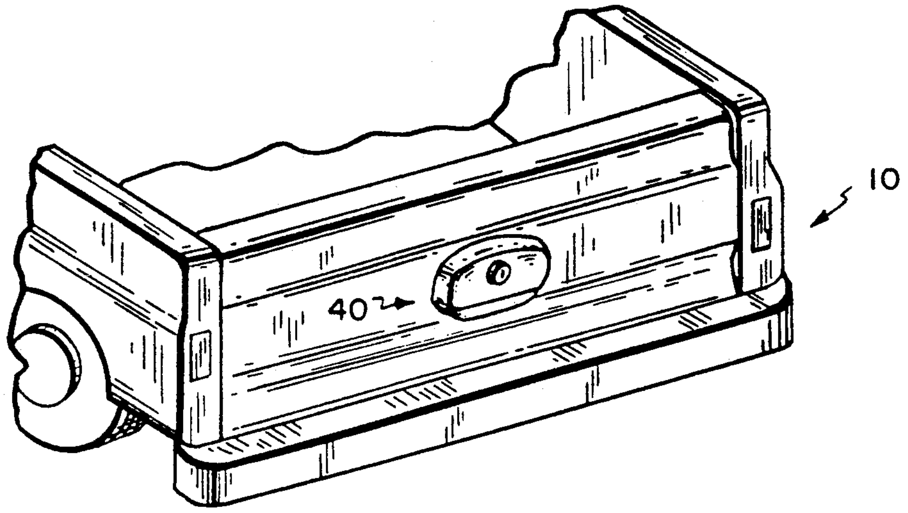
FIG. 1 is a frontal left perspective of the tailgate on the back of a pickup truck.

Referring to FIG. 1 of the drawings, reference numeral 10 designates generally a tailgate of a pickup truck. The tailgate 10 is shown in its upright and locked position, closing off the rear of the cargo space.

Figure 2:
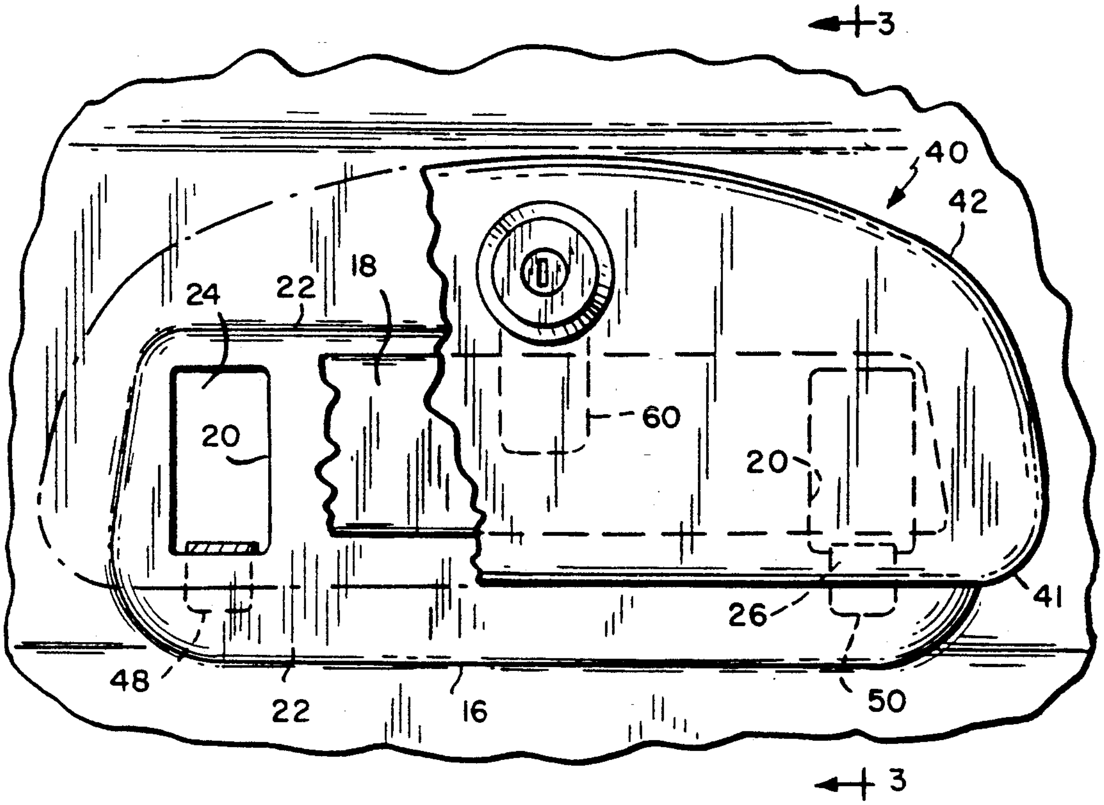
FIG. 2 is a frontal view of the tailgate guard assembly in its locked position on a tailgate.
Figure 3:
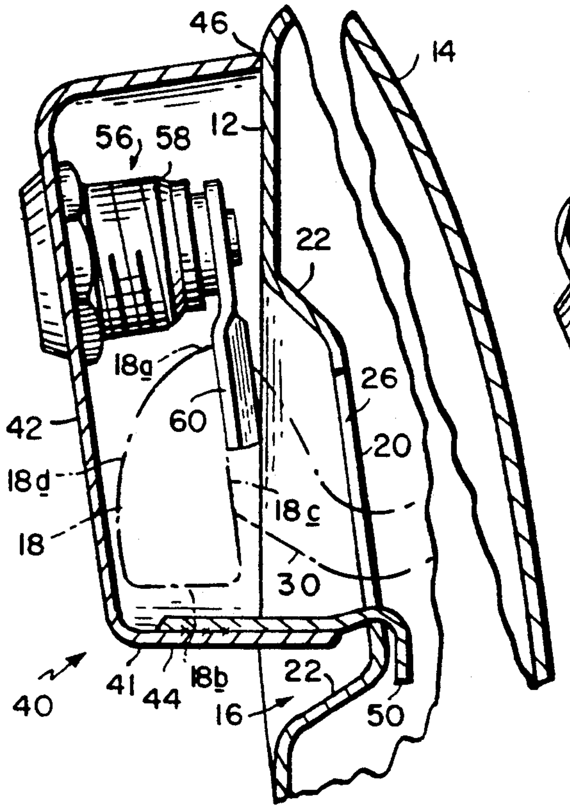
FIG. 3 is a sectional view taken along line 3—3 of FIG 2.
Figure 4:
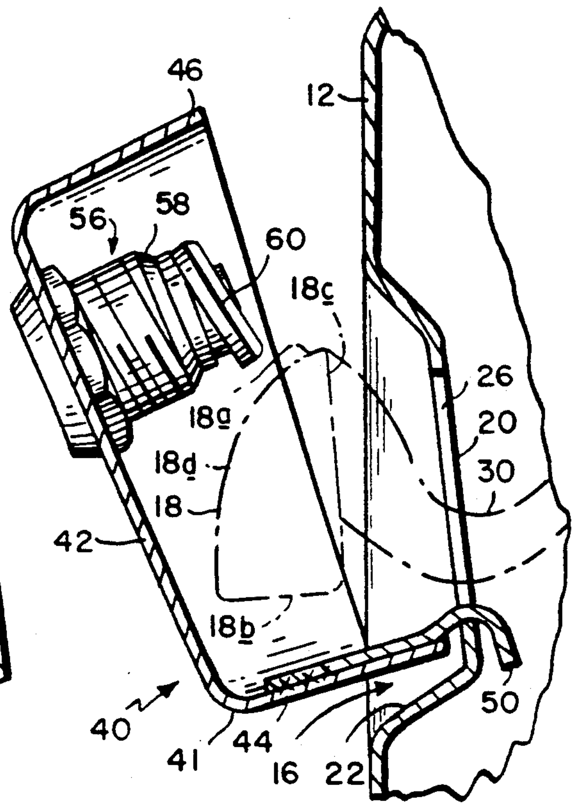
FIG. 4 is a sectional view similar to that of FIG. 3, but with the guard assembly in a partly engaged or disengaged position.

As best seen in FIG. 3, the tailgate has an outer panel 12 spaced apart from an inner panel 14. As shown in FIGS. 2, 3 and 4, the outer panel 12 is indented to form a handle recess 16 which accommodates a tailgate release handle 18. The recess 16 has a back wall 20 and peripheral walls 22. The back wall 20 is provided with rectangular apertures 24 and 26 which extend the vertical length of the back wall and are horizontally spaced from each other at opposite ends of the back wall. The release handle 18 has an upper edge 18*a*, a lower edge 18*b*, an inner face 18*c* and an outer face 18*d*.

Arms 30, which are attached at opposite ends of handle inner face 18*c*, extend inwardly from the inner face, each arm passing through a corresponding aperture 24 or 26, and connecting to a latching mechanism (not shown). As best seen in FIGS. 3 and 4, the release handle 18 substantially protrudes from the recess 16 past the outer panel 12, leaving a space between the handle inner face 18*c* and the exterior surface of the outer panel. Rotation of the handle 18 upward about a horizontal axis unlatches the latching mechanism and thereby releases the tailgate, allowing it to be pivoted about its horizontal axis and, if desired, removed from the vehicle.

Figure 5:
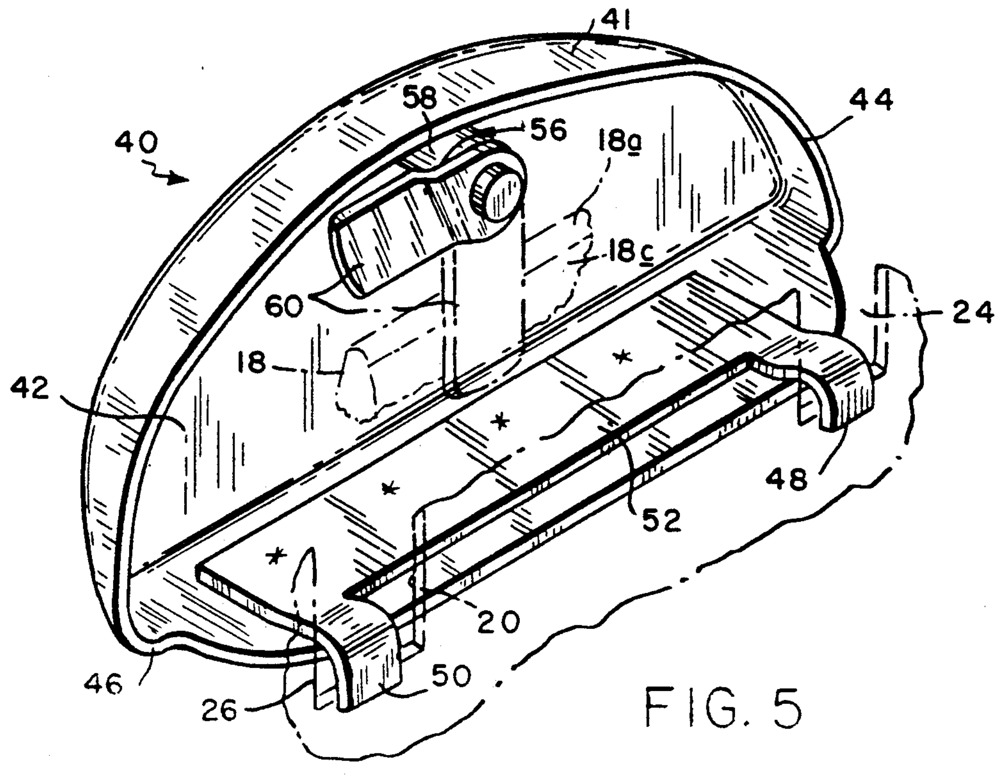
FIG. 5 is a rear view of the tailgate guard assembly in its locked position on the tailgate.

FIGS. 2 and 5 show a tailgate release handle security device 40, preferably made of stainless-steel or the like, comprising a cover 41 having a plate 42 and an integral, inwardly extending skirt 44 that bears against the panel 12 (FIG. 3). The skirt 44 stiffens the plate 42 and provides space behind the plate to accommodate the tailgate release handle. A gasket 46 of rubber or other soft material is attached to the rim of the skirt 44 to prevent scratching of the outer panel 12.

A pair of hooks 48 and 50 extend rearwardly from the lower edge of the skirt 44 and through the apertures 24 and 26 to bear against the inner surface of the outer panel 12.

A lock 56, mounted in the plate 42, includes a lock stem 58 and a locking dog 60. As best seen in FIG. 5, the lock 56, which is actuated by a key (not shown), is rotatable between (a) an unlocked position in which the locking dog 60 is in a horizontal, disengaged orientation and (b) a locked position in which the locking dog engages the top edge 18*a* of the handle inner face 18*c*. As shown in FIG. 3, the locking dog 60 has a twist so that the surface of the handle 18 does not interfere when the dog is rotated into engagement therewith. The same twist provides a camming action that exerts an outward force on the handle that increases with the rotation of the locking dog into the locked position, thereby pressing the handle security device against the outer panel. Moreover, the locking dog 60 is tilted relative to the vertical so that in its locked position it applies to the handle 18 a force having a downward component, thereby urging the handle against its downward limit of travel. Pulling on the handle security device when it is locked on the tailgate thus tends to rotate the handle in the same direction. This is opposite to the direction in which the handle must be rotated to open the tailgate, i.e. upward.

The security provided by the tailgate release handle security device 40 results mainly from the interaction of its geometry with that of the handle 18 and arm 30. When the handle is rotated upward from its rest position to unlatch the tailgate 10, the movement of its bottom edge 18*b* includes a substantial lateral outward component. The upper edge 18*a*, on the other hand, moves outward only a negligible distance. Also, when the security device 40 is in place, the lower portion of the plate 42 is horizontally close to (which includes contact with) the handle bottom edge 18*b*.

Thus rotation of the handle requires outward movement of the lower portion of the plate 42. However, this requires pivoting of the security device 40 around the hooks 48 and 50 and, therefore, a substantially greater outward displacement of the upper portion of the security device. Such displacement is impossible because the locking dog 60 pulls against the handle upper edge 18*a* and the upper edge is incapable of substantial outward displacement. Thus, it is physically impossible to pull the security device 40 away from the outer panel 12 and it is physically impossible to actuate the handle 18 while the security device is secured against the outer panel.

Moreover, one cannot remove the security device 40 by forcing it upward to disengage the hooks 48 and 50 from the outer panel 12. The bottom portion of the skirt 44 is close to, or in contact with, the bottom edge 18*b* of the handle 18 so that the handle prevents appreciable upward movement of the security device 40. Moreover, the hooks 48 and 50 are dimensioned so that the overlap between the hooks and the back of the outer panel 12 is greater than the upward distance of travel of the cover 40 before the cover engages the handle 18.

Accordingly, unauthorized actuation of the handle 18 requires significant damage to the tailgate or picking of the lock 56. The damage makes the tailgate unsaleable and picking of the lock ordinarily requires too much time for theft of the tailgate.

To install the handle security device 40, the hooks 48 and 50 are inserted into the corresponding apertures 24 and 26, respectively, and the handle security device 40 is pushed inward toward the tailgate outer panel 12 until the handle security device contacts the exterior surface of the outer panel. The key then is turned to rotate the lock 56 into the locked position. When thus installed on the tailgate, the plate 42 covers the release handle 18 thereby preventing access to the handle as described above.

To remove the handle security device 40, the lock is rotated into the unlocked position. Then, the handle security device is lifted outward from the tailgate outer panel 12 and the hooks 48 and 50 are slidably removed from their corresponding apertures 24 and 26.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A tailgate release handle security device for attachment to a tailgate that has an outer panel spaced apart from an inner panel, wherein said outer panel is indented to form a recess having a back wall and peripheral walls, the back wall having a pair of vertical apertures horizontally spaced from each other, each of said apertures accommodating an arm, said arms being connected to a latching mechanism and extending through said apertures to attach to a tailgate release handle having an upper edge and a bottom edge, the handle and the arms being capable of rotation about a horizontal axis to release the latching mechanism and thereby to permit opening of the tailgate, said handle moving upward and outward from said outer panel during said rotation such that the lateral outward component of the movement of the upper edge of the handle is less than that of the bottom edge, said security device comprising:

A. a cover shaped to accommodate the tailgate release handle;

B. means for hooking the lower portion of said cover to the tailgate; and

C. locking means mounted in said cover, said locking means having a locking dog which, when it is in a locked position, bears against the back of the handle substantially at said upper edge thereof.

2. A security device as in claim 1 wherein said cover is shaped so that when the device is attached to the tailgate, the cover is horizontally close to the bottom edge of the handle so as to limit the outward movement of the bottom edge of the handle thereby preventing rotation of the handle and the resulting release of the latching mechanism.

3. A security device as in claim 1 wherein said cover is shaped so that when the device is attached to the tailgate, the cover has a horizontally-extending portion below the release handle which is close to the bottom edge of the handle to prevent appreciable upward movement of the security device that would unhook the device from the tailgate.

4. A security device as in claim 3 wherein said hooking means comprise a plurality of hooks that are dimensioned so that, when the security device is attached to the tailgate, the length of overlap of the hooks and the outer panel is greater than the upward movement of the cover before said horizontally extending cover portion contacts the hand.

5. A security device as in claim 1 wherein said locking dog, when in its locked position, tends to rotate the handle in a direction opposite to the direction of rotation of the release handle for release of the latching mechanism.

6. A security device as in claim 1 wherein said cover includes a plate attached to an inwardly extending skirt, said skirt having a rim which, when said device is attached to the tailgate, bears against the tailgate outer panel.

7. A security device as in claim 6 wherein said skirt, when said security device is attached to the tailgate, is close to the bottom edge of the tailgate release handle to prevent appreciable upward movement of the security device.

8. A security device as in claim 6 wherein, when said security device is attached to the tailgate, the plate is close to the bottom edge of the handle so as to limit the outward movement of the handle and thereby prevent release of the latching mechanism.

9. A security device as in claim 1 wherein said hooking means includes a pair of hooks extending from said cover, said hooks being capable of insertion through said apertures to bear against the back of said outer panel when said security device is attached to the tailgate.

10. A security device as in claim 1 wherein said locking dog includes a camming surface that exerts an outward force on the handle that increases with the rotation of the locking dog into the locked position.

11. A security device as in claim 1 wherein said locking dog is tilted relative to the vertical so that when the locking dog is in its locked position, it applies to the handle a force having a downward component, thereby urging the handle against its downward limit of travel.

12. A security device as in claim 1 wherein said cover has a rim that bears against the outer panel when said security device is attached to the tailgate and said device further including a gasket of soft material attached to the rim of said cover, said gasket being positioned between said rim and the tailgate when said security device is attached to the tailgate.

* * * * *